L. LYNDON.
DYNAMO ELECTRIC MACHINE.
APPLICATION FILED OCT. 2, 1906. RENEWED MAY 18, 1907.

913,666.

Patented Feb. 23, 1909.

Attest:
C. S. Ashley.
A. L. O'Brien

Inventor:
LAMAR LYNDON
by Dickerson, Brown,
Raegener & Binney Attys.

UNITED STATES PATENT OFFICE.

LAMAR LYNDON, OF EAST ORANGE, NEW JERSEY.

DYNAMO-ELECTRIC MACHINE.

No. 913,666.          Specification of Letters Patent.          Patented Feb. 23, 1909.

Original application filed July 6, 1905, Serial No. 268,321. Divided and this application filed October 2, 1906, Serial No. 337,088. Renewed May 18, 1907. Serial No. 374,350.

*To all whom it may concern:*

Be it known that I, LAMAR LYNDON, a citizen of the United States, and resident of East Orange, county of Essex, State of New Jersey, have invented certain new and useful Improvements in Dynamo-Electric Machines, of which the following is a specification, accompanied by drawings.

This application is a division of my copending application, Serial No. 268,321, filed July 6, 1905, for a system of electric generation, distribution and control.

This invention relates to dynamo electric machines, more particularly to machines adapted to be carried by the axle of a car and used for train lighting, for propelling purposes or for any purpose for which the machine is adapted.

The objects of the invention are to enable a dynamo electric machine to be applied directly over a shaft or axle which is blocked or provided with wheels as the case may be at either end so that the dynamo electric machine cannot be slipped over the end of the axle or shaft. According to this invention the machine is driven from or drives the axle without the interposition of driving gears or other operative connections and the invention is preferably applied to certain classes of alternating current dynamo electric machines, the parts of which may be split or separated in such manner that they may be placed over the shaft or axle to inclose the same without disturbing the windings of the machine.

Illustrations of the classes of dynamo electric machines to which the invention may be applied are the inductor alternators, machines having solid inductors, induction motors having squirrel cage rotors and alternating current dynamos having pole wound rotors. In all of these machines both the rotor and stator may be made in halves like a split pulley with proper flanges and bolts or other devices to join the halves rigidly together over the shaft or axle, making a continuous rigid circular structure.

Further objects of the invention will hereinafter appear and to these ends the invention consists of apparatus for carrying out the above objects embodying the features of construction, combinations of elements and arrangement of parts having the general mode of operation substantially as hereinafter fully described and claimed in this specification and shown in the accompanying drawings, in which,—

Figure 1:
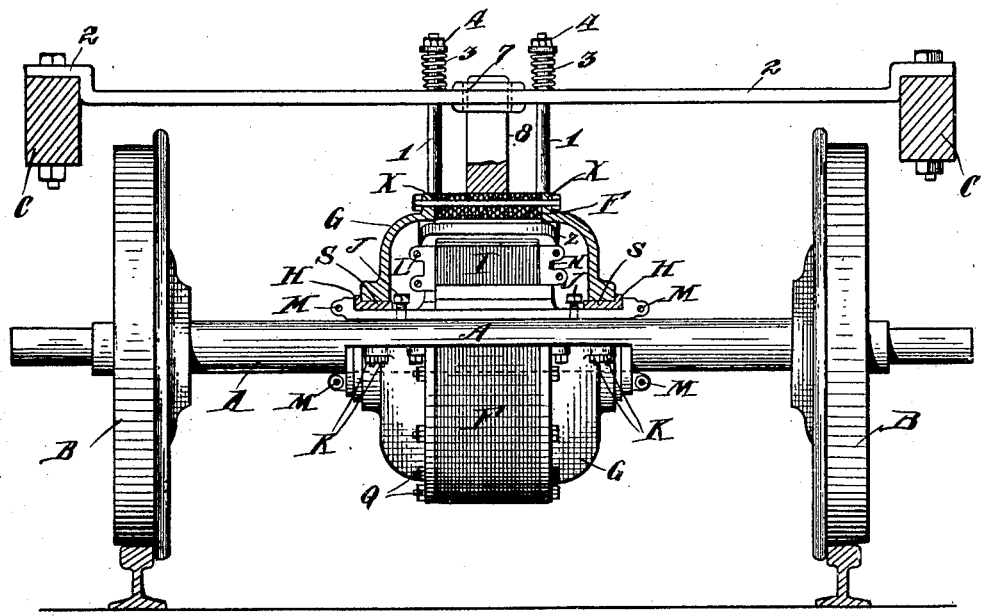
Figure 2:
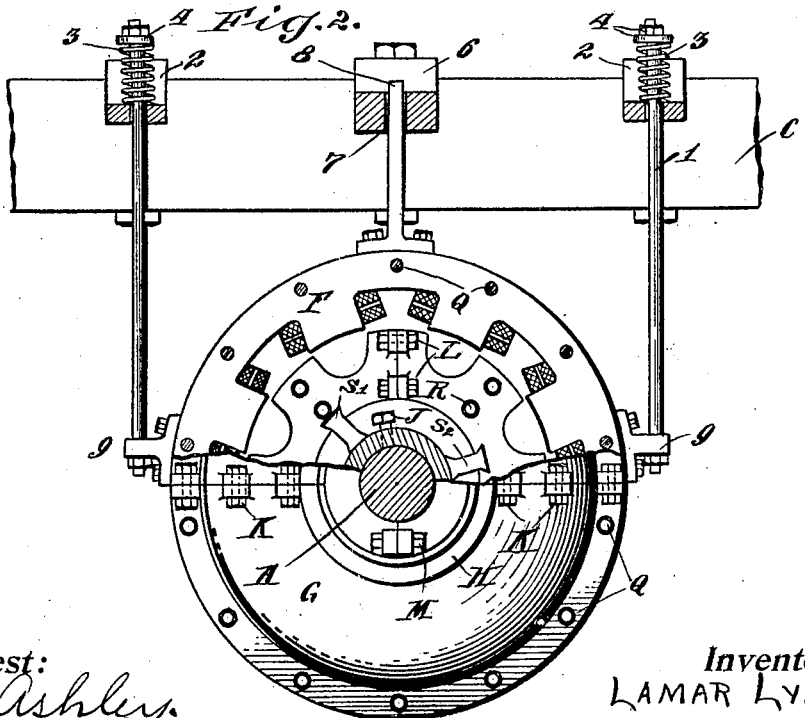

Figure 1 is a longitudinal elevation partly in section of a dynamo electric machine embodying the invention applied to a car axle; Fig. 2 is an end elevation partly in transverse section.

Referring to the drawings A represents the axle of a car having the wheels B, and C, are the sills of the truck connected by cross pieces 2.

The inductor I is made up of laminations of soft iron, having the proper shape to cause shifting and reversal of magnetic lines through the magnetic structure F, in which the windings Z are placed. The laminations in I are held in place on a non-magnetic spider S, having the usual supporting and driving spokes $S^1$, $S^2$ and $S^3$ and the clamping plate N, as is well known in the art. The spider shaft S is hollow as shown. The entire structure is split axially into halves and when re-assembled the halves are held together by the lugs and bolts L on the spider and clamping plates, and N on the ends of the hollow shaft S. Set screws J passing through the hollow shaft S serve to center the structure about the driving axle A, which passes through hollow shaft S, and hold same firmly. Brass wedges or other devices well known in the art may be substituted, however, if desired. With this construction the inductor may be split by removing bolts L and M, the halves put over axle A and again bolted together, after which it is clamped to the axle and centered by set screws J. The magnetic framework F is also preferably made up of soft laminated iron clamped between the two end pieces G, which have flanges X that abut against the laminated mass, the whole being held and clamped together by means of bolts Q, which are spaced around the circumference of the structure, and pass through the laminations and the flanges X. The laminations are sectors only, and do not extend more than one half the distance around the circle formed by these sectors. The end pieces G are of a spheroidal shape, as shown and are provided with circular openings at their outer ends to carry the journals H. These end pieces G are split axially into halves, which may be separated, put around the axle and the inductor, and then joined solidly together by means of lugs and bolts K. The journals H are also split axially into halves, but have no lugs nor bolts to hold them together, as the end frames G hold them sufficiently. They are provided with flanges on either end, as shown, to prevent lateral displacement.

The magnetic frame F is shown in Fig. 2 as having polar projections on which the windings are placed. This form is preferable owing to the greater ease of connecting the separate windings together after the frame has been split and put in place over the axle A and inductor I. A distributed winding, however, may be used if desired.

The whole structure forms a completely inclosed, light dynamo of simple and solid construction. It is, however, to be understood that this form is merely shown here as illustrative of the character of the system and the invention is by no means limited by this design.

The method of suspension is preferably as indicated in Figs. 1 and 2. Rods 1 are fastened into lugs 9 on the outer frame. These rods pass upwards through iron cross pieces 2, which run from one truck beam across to the opposite one.

Compression springs 3, through which the rods 1 pass support the weight, the upper ends of the springs pressing upwards on the washers and nuts 4 of the rods 1, and the lower ends resting on the cross pieces 2. The springs are adjusted to exert a pressure just equal to the weight of the dynamo so that the car axle is relieved of this weight. This flexible support allows the dynamo to rise and fall with respect to the truck as the car wheels and axle rise and fall.

The magnetic drag on the field frame F which tends to cause it to rotate with the inductor is resisted by the piece 8 which is fastened to and projects outwardly from the field frame. This piece projects up into an opening 7 which is formed in an iron cross bar 6, this bar being also fastened to the truck beams. The torque of F in either direction is resisted by the sides of the opening 7 in the cross beam 6, acting against 8. Vertical motion, however, is not restrained and the necessary motion of the dynamo with respect to the truck is not interfered with.

There are many possible variations of this invention that will suggest themselves to those skilled in the art, and it is also obvious that some portions may be used without others.

Without enumerating variations and equivalents I claim as my invention:—

1. In combination with the sills, cross pieces and axle of a car truck, of an alternating current dynamo electric machine having stationary and moving parts formed in separable sections the coöperating parts of the rotor being secured directly to the axle, and the parts of the stator inclosing the rotor and being suspended from the truck cross pieces independently of the axle, and means for cushioning the suspension of the stator.

2. In combination with the sills, cross pieces and axle of a car truck, of an alternating current dynamo electric machine having stationary and moving parts formed in separable sections the coöperating parts of the rotor being secured directly to the axle, and the parts of the stator inclosing the rotor and being suspended from the truck cross pieces independently of the axle, means for cushioning the suspension of the stator and means permitting vertical play between the stator and truck for resisting torque in the stator.

In testimony whereof I have signed this specification in the presence of two subscribing witnesses.

LAMAR LYNDON.

Witnesses:
 HAROLD B. ATKINS,
 OLIN A. FOSTER.